United States Patent [19]
Galles et al.

[11] Patent Number: 5,504,874
[45] Date of Patent: Apr. 2, 1996

[54] SYSTEM AND METHOD OF IMPLEMENTING READ RESOURCES TO MAINTAIN CACHE COHERENCY IN A MULTIPROCESSOR ENVIRONMENT PERMITTING SPLIT TRANSACTIONS

[75] Inventors: Michael B. Galles, Los Altos; Martin M. Deneroff, Palo Alto, both of Calif.

[73] Assignee: Silicon Graphics, Inc., Mountain View, Calif.

[21] Appl. No.: 128,080

[22] Filed: Sep. 29, 1993

[51] Int. Cl.⁶ .............................. G06F 13/00; G06F 15/16
[52] U.S. Cl. .................... 395/472; 395/468; 395/435; 395/200.16; 364/229.2; 364/230; 364/242.91; 364/253; 364/259.2; 364/931.4; 364/931.41; 364/933; 364/947.2; 364/948.3; 364/948.32; 364/DIG. 2
[58] Field of Search ...................... 395/800, 400, 395/425, 650, 725, 200, 375, 200.06, 472, 468, 435, 200.16; 364/DIG. 1, DIG. 2

[56] References Cited

U.S. PATENT DOCUMENTS

| | | | |
|---|---|---|---|
| 3,771,137 | 11/1973 | Barner et al. | 395/447 |
| 4,142,234 | 2/1979 | Bean | 395/471 |
| 4,376,982 | 3/1983 | Bantz et al. | 395/285 |
| 4,622,631 | 11/1986 | Frank et al. | 395/800 |
| 4,747,043 | 5/1988 | Rodman | 395/425 |
| 4,815,030 | 3/1989 | Cross et al. | 395/600 |
| 4,905,141 | 2/1990 | Brenza | 395/456 |
| 4,928,225 | 5/1990 | McCarthy et al. | 395/425 |
| 5,113,514 | 5/1992 | Albonesi et al. | 395/425 |
| 5,224,214 | 6/1993 | Rosich | 395/250 |
| 5,226,150 | 7/1993 | Callander et al. | 395/185.1 |
| 5,230,048 | 7/1993 | Moy | 395/600 |
| 5,237,567 | 8/1993 | Nay et al. | 370/85.1 |
| 5,265,235 | 11/1993 | Sindhu et al. | 395/425 |
| 5,265,257 | 11/1993 | Simcoe et al. | 395/736 |
| 5,276,851 | 1/1994 | Thacker et al. | 395/425 |
| 5,282,272 | 1/1994 | Guy et al. | 395/200.06 |
| 5,347,648 | 9/1994 | Stamm et al. | 395/575 |

OTHER PUBLICATIONS

Stephen B. Furber, VLSI RISC Architecture and Organization, Marcel Dekker, Inc., New York and Basil, pp. 32–45.
David A. Patterson et al., Computer Architecture A Quantitative Approach, Morgan Kaufmann Publishers, Inc., pp. 408–425, 454–474 and 574–576.

Primary Examiner—Mseng-Ai An
Attorney, Agent, or Firm—Sterne, Kessler, Goldstein & Fox

[57] ABSTRACT

A multiprocessing system that uses read resources to track cache coherent split transactions on its main system bus. Pending reads are tracked by being associated with read resources. When a read request is issued, it occupies the first available read resource. A pending read request will occupy a read resource until a corresponding read response appears on the bus. If all read resources are filled, future read requestors must wail until a read resource becomes available.

13 Claims, 4 Drawing Sheets

SYSTEM AND METHOD OF IMPLEMENTING READ RESOURCES TO MAINTAIN CACHE COHERENCY IN A MULTIPROCESSOR ENVIRONMENT PERMITTING SPLIT TRANSACTIONS

BACKGROUND OF THE INVENTION

1. Field of the Invention

The present invention relates generally to the field of computers, and more particularly, to a system and method of managing read resources in a multiprocessing environment.

2. Related Art

Modern multiprocessing systems typically have a plurality of processors, a main memory and other input/output (I/O) devices that are coupled to a main system bus. To permit maximum utilization of the bus these systems use split transactions. (For simplification, the processors, main memory and I/O devices will be referred to as "nodes".) A split transaction is a read transaction that is split into a read request transaction that contains the address of the data requested, and a reply transaction that contains the requested data. Reply transactions are also called read responses. Each transaction must be tagged so that the requesting node and the replying node (e.g., main memory or a processor having the requested data in its cache) can keep track of the status of the read request. When individual transactions being performed by a node are long in duration, a split transaction approach allows several transactions to simultaneously occupy the bus, thus increasing the effective bandwidth of the bus.

In order to support split transactions on a shared bus, both the requesting node and the replying node must arbitrate for the bus to perform their respective functions. Thus a split transaction bus has higher bandwidth, but usually has higher latency than a bus that is held for the entire read transaction.

A cache coherent system bus can also use split transactions. However, to maintain cache coherency all nodes on the bus must be aware of all pending split transactions. Those nodes that do not have caches must also be aware of all pending split transactions. What is desired is a mechanism to handle split transactions and maintain cache coherency across a multiprocessing domain.

SUMMARY OF THE INVENTION

Once a read transaction is split and left pending, the read request and read response must be protected from a new transaction that could disturb the state of the data addressed by the pending transaction. Read resources according to the present invention are a protection for those pending transactions. When a read request is issued it is allocated a read resource from a pool of read resources. The read resource protects the read request for the duration of its pendency. When the transaction ends, the read resource assigned to that transaction terminates. Thus, this read resource or protector stays with the transaction until its conclusion, and at the conclusion of the transaction the read resource is released back to the free pool.

The present invention is a system and method of implementing read resources. Read resources allow transactions to be physically split, while permitting transactions to remain logically unified. As long as coherent transactions do not conflict with each other (i.e., are not targeting the same physical address, block of data or cache line), several can occupy the bus concurrently. Any conflicting coherent transactions must be issued serially.

In the preferred embodiment of the present invention, read resources are implemented as a series of tags which track outstanding read requests and read responses. The system designer chooses the maximum number of simultaneously pending split transactions by setting the number of read resource tags. Each node on the bus must then abide by the contents of the read resource tags, and only issue coherent transactions which do not conflict with the currently pending read resources. The tags are maintained in a fully associative manner to minimize read resource tag contention. New split transactions can occupy any read resource tag without restriction.

Read resources also provide a method by which read responses can be issued from the node with the most recent copy of the data. When a read request appears on the bus, the memory system will generally respond before processors which may have more recent data available. Once the memory responds, a processor may indicate that more recent data may be available by asserting the pending read resource associated with the pending read. Once that processor has completed its check for more recent data, it may provide that data or simply de-asserting the read resource.

According to the present invention, non-coherent reads may only occupy the first seven read resources, while coherent reads may occupy all eight. This restriction on non-coherent reads exits to prohibit read requests to I/O nodes, which are non-coherent, from occupying all read resources and potentially creating a deadlock situation.

BRIEF DESCRIPTION OF THE FIGURES

The invention will be better understood if reference is made to the accompanying drawings in which.

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

The following two text books provide further discussions of modern system buses and transactions between nodes on such buses: John L. Hennessy et al., "Computer Architecture—A Quantitative Approach", (Morgan Kaufmann Publishers, Inc., San Mateo, Calif., 1990); and Stephen B.

Furber, "VLSI RISC Architecture and Organization", (Marcel Dekker, Inc., New York, N.Y., 1989), which are incorporated herein by reference.

Read Resources System Overview

Figure 1:
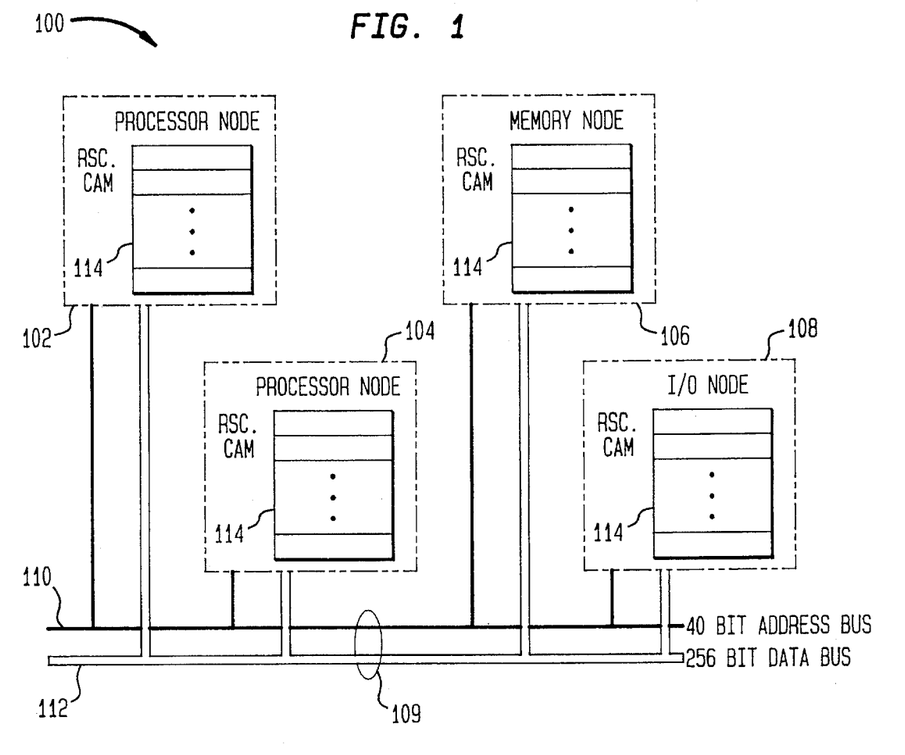
FIG. 1 shows a high level representative block diagram of a multiprocessing system incorporating read resources according to the present invention.

Now turning to a detailed description of the present invention, FIG. 1 shows a high level representative block diagram of a multiprocessing system 100 incorporating read resources according to the present invention. A plurality of nodes include processor nodes 102 and 104, memory node 106 and an input/output (I/O) node 108. Each node is coupled to a main system bus 109 comprising at least an address bus 110 and a data bus 112. As would be apparent to a person skilled in the relevant art, the number and type of nodes coupled to buses 110 and 112 may vary greatly.

Reads on the main system bus 109 are split into read requests and read responses. This allows other transactions, including other read requests, to occur between a read request and read response pair, because the memory or cache of another processor, for example, will require several cycles to provide the data.

After a read request is issued on the bus, the read is said to be pending. It will remain pending until the read response which satisfies the request is issued. While the read is pending, no coherent transactions which target the same data as the pending read may be issued. This restriction allows reads to behave as if they were not split transactions for coherency considerations.

To enforce this restriction, each node on the bus must keep track of pending coherent reads. Because this requires a fully associative comparison to occur at each node before it can issue a coherent transaction, the bus protocol limits the number of pending reads. In the preferred embodiment of the present invention, no more than eight reads may be pending at any given time.

There is no coherency restriction for pending, non-coherent reads, but non-coherent reads must follow the pending read limit as well. This provides flow control for non-coherent reads and simplifies the implementation of the read response control logic (to be described in detail below).

Figure 2:
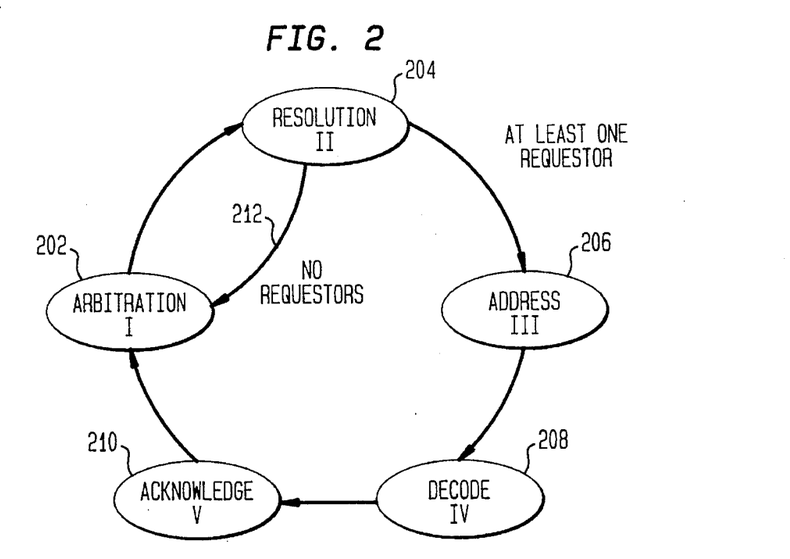
FIG. 2 is a state diagram of the main system bus.

FIG. 2 is a state diagram of the main system bus 109. Each bus transaction consists of five cycles: arbitration, resolution, address, flow control, and acknowledge, labeled 202, 204, 206, 208 and 210, respectively. When the bus is idle, it drops into a two-cycle mode, as shown by arrow 212. This allows new requests to appear on an idle bus as soon as they are ready, instead of waiting for the arbitration cycle to arrive.

The main system bus 109 also includes a number of other buses/lines which are not shown in FIG. 1. The main system bus 109 also includes a 256 bit wide data bus 112, a 40 bit wide address bus, an 8 bit wide command bus. The functionality of the ADDRESS_HERE line will be described below.

A data resource identification number bus (DRSC) comprises 8 lines that are valid during cycle III. As with many of the buses in the system, the DRSC bus is considered time multiplexed, since it functions differently during different bus cycles. Thus, the 8 lines of the DRSC bus are also used as inhibit lines during cycles I and V.

The 40 bit wide address bus and 8 bit wide command bus are time multiplexed and subgrouped into 3 16-bit wide buses. During the acknowledge cycle 210, the upper 16 lines are used by the nodes as address not acknowledged (NACK) lines (i.e., one line per node, assuming 16 maximum nodes in the preferred embodiment), which are also called ADDRESS_ERR lines. The middle 16 lines are used by the nodes as data NACK lines, which are called DATA_ERR lines. The lower 16 lines are used by nodes as lines to specify whether a read response is shared or not. An ADDRESS_HERE line is used indicated whether a read request is valid.

Multi bit parity/parity error lines, and address bus and data bus arbitration lines are also included. The bus parity scheme is omitted from this description because it is beyond the scope of the present invention. An appropriate parity scheme would be apparent to a person skilled in the relevant art.

Address lines in the address bus 110 are used for arbitration and acknowledgement as well as for transmitting addresses. During the address cycle 206, a node granted use of the address bus (e.g., for issuing a read request) drives the address and command buses. Simultaneously, a node granted use of the data bus 112 (e.g., for a read response) drives the read resource number of its read response on the DRSC bus. For read requests, writes, updates, and invalidates, the data resource number is not driven.

The DRSC bus also functions as an inhibit bus. The inhibit bus is used to indicate that a bus node which has a cache has not yet completed its cache snoop. Inhibits are driven on cycles I and V. Note that cycle I appears on an idle bus as well as a busy bus, as the inhibit bus must be visible at all times. Each line of the inhibit bus corresponds to a read resource.

Read Request

The read request transaction does not use the data bus 112. A read request may be issued any time a read resource is available, assuming the read address does not conflict with any other pending coherent read addresses. To issue a read request, a node on the bus asserts its address arbitration line only. If arbitration is won, the node issues an address and command during the address cycle. The read is now pending, and every node in the system must place the read address in the first available read resource register (to be described below). This placement is deterministic, as the read resource information must be identical across all nodes.

The implementation of address and data bus arbitration are beyond the scope of the present invention. Appropriate arbitration protocols would be apparent to a person skilled in the relevant art.

A read request can be coherent or non-coherent. A coherent read cannot be issued if it targets the same cache block as another pending coherent read; non-coherent reads need not follow this restriction. When a non-coherent read fills a read resource register, it will block coherent requests targeting the same cache block. Note, however, that this scenario should preferably not occur; a particular cache block should be considered either coherent or non-coherent system wide.

Once successfully issued, a read request will remain pending until a read response indicates it is for a particular pending read request by asserting the data resource number associated with that pending read request.

Read Response

The read response transaction does not use the address bus 110. When a node is ready to provide a read response for a pending read request, it arbitrates for the data bus 112 only.

If arbitration is granted, the node drives the read resource number it is responding to on the DRSC bus during the address cycle. The read resource number for a read request is determined by each node after the read request is issued. Each node will determine the same read resource number for a specific read request, such that all nodes can track the progress of that specific read request using the same read resource number. The specific manner in which a read resource number is assigned is discussed below. Read response data begins two cycles later.

When a read request appears, the memory corresponding to the address of the read request will drive the ADDRESS_HERE line. If no memory node drives the ADDRESS_HERE line, all nodes will understand that read request is an error (i.e., its a read to an address that does not exist).

If a node with a cache has not had enough time to complete a snoop and determine the state of its local copy, it will drive the inhibit line on the DRSC bus. This indicates that the requestor must not use the transferred data until the node completes its snoop and either supplies a new read response or stops driving the inhibit line. The node driving inhibit must continue to do so during each acknowledge cycle until it completes its snoop. If it finds that the data is clean in its cache, it changes its cache state to shared or invalid, as appropriate, and stops driving the inhibit line. This allows the requester to use the data transferred by memory and frees the associated read response. If the cache line is dirty, the node transfers the dirty data to the requester and changes its state to shared or invalid, as appropriate. Memory will respond to any read request as long as a node with a cache has not yet provided data satisfying the read. For responses to both coherent and non-coherent read requests, any node may indicate an error during the read response by driving the data error line.

Memory nodes write coherent block read response data provided by other devices back into main memory. The memory may NACK a read response provided by another node if it has insufficient buffer space to store the data when the read response occurs. The responding node must resend the read response.

Read Resource CAMs

Read resources are implemented as Content Addressable Memories (CAMs). Read resource CAMs 114 are distributed throughout the system, with a full CAM and an associated CAM controller logic (not shown) residing in each node. Each node must have a consistent copy of the read resources in its CAM to maintain cache coherency. Pending transactions are entered in the read resource CAMs 114 throughout the system so that split transactions can be tracked and protected. Read resources protect split transactions by preventing the broadcasting (e.g., transmission on the bus) of new transactions which target the same address as pending transactions. Read resources are also used to identify read responses, as well as indicating the termination of a transaction.

Figure 3:
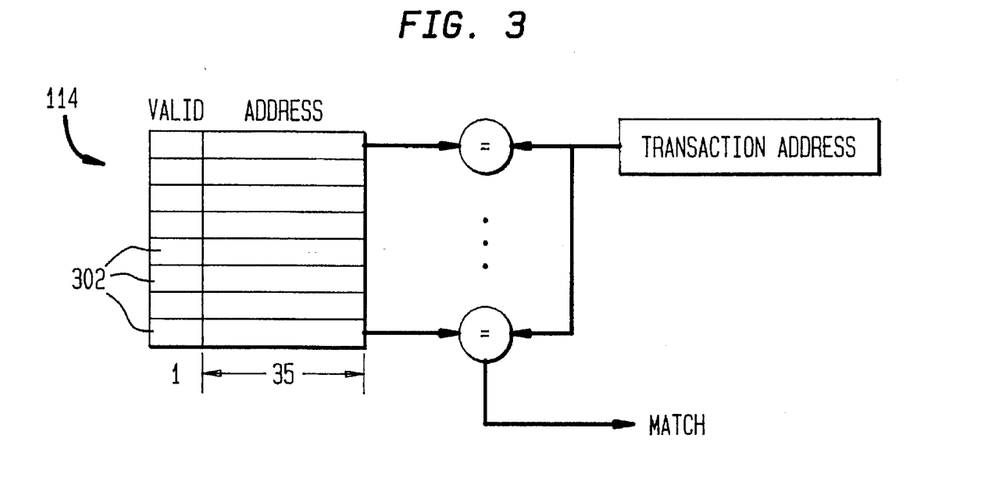
FIG. 3 shows a preferred embodiment of a read resource CAM of the present invention.

Each read resource CAM 114 includes a number of storage registers, elements, or the like, (302) equal to the number of read resources desired, and each register is a predetermined number of bits wide. A preferred embodiment of a CAM of the present invention is shown in FIG. 3. Each CAM 114 is preferably 8 registers deep. The entries 302 are assigned read resource numbers 0–7 and are implicit according to their entry position in the CAM 114. For example, the top entry of CAM 114 can be read resource 0 and the bottom entry read resource 7. Increasing the number of registers (read resources) can facilitate a slower memory system, allow for interventions from processors or allow for longer reads to I/O devices.

A single register comprises a number of bits of physical address as well as one valid bit. The total width of the read resource CAM is determined by the size of the physical address. To avoid address aliasing, the read resource CAM width is equal to the total width of the physical address minus the width of data transferred in a single bus transaction (this latter number is typically the cache line size.) In addition to the address, each CAM register also contains a single bit which indicated that the entry is currently valid (in use) and protected.

According to the preferred embodiment, each register 302 is 36 bits wide. 35 bits consists of the full address down to the double word level, and one valid bit. When the valid bit is turned "on" the resource is allocated, that address is activated and is currently being protected by a read resource. When a transaction is terminated, the corresponding valid bit of the read resource is turned "off". Turning off the valid bit returns the resource to the free pool.

When any node attempts to initiate a new transaction, the transaction address is first compared with each entry in the read resource CAM. This is shown diagrammatically in FIG. 3. If a "match" is found by one of the comparators 304, the transaction is not allowed to proceed until the matching entry becomes invalid. By blocking new transactions when a match with a pending transaction occurs, the read resource CAM 114 protects the pending transaction from conflicting bus traffic.

When a node successfully places a read request on the bus (i.e., no match is found in the local CAM), a read resource is allocated and an entry is made in a register of the read resource CAM of that node. When that node places the read request on the bus it is said to "broadcast" the transaction. Thus, every other node will observe this request. Each of the other nodes will deterministically assign the same read resource number to that read request, and it will store the address of the read request at the same register in its CAM and mark that entry valid. The read request is now considered pending, and occupies exactly one, and the same, numbered register in each read resource CAM. In this way it is guaranteed that the distributed system will all be in step (i.e., each CAM will have the same read resource information).

A major advantage in the above described distribution is that the read resource information implicitly flows to all nodes without any additional communication overhead. In a similar fashion, when read responses are transmitted on the bus, the appropriate read resource number is also transmitted (on the DRSC bus as discussed above). This tagging of read responses with read resource numbers is an efficient way to provide response data without rebroadcasting the read address, and thus conserving bus bandwidth.

Controlling the Read Resource CAM

It is critical that each node's read resource CAM be identical at all times. Since the read resources are distributed, each node allocates and de-allocated read resources according to a precise set of conditions. These conditions depend on the current state of the read resource CAM, as well as bus activity. Allocation and de-allocation of read resources is described in detail, including pseudo code, below.

Read Resource Allocation

Read resources are allocated when a new read request appears on the bus. In the implementation described below, a read request must appear on the bus without encountering errors if it is to be allocated a read resource. There are several errors which can prevent a read resource from being allocated to a successful read request. An error is indicated by the ADDRESS_ERR line being asserted, or by the ADDRESS_HERE line not being asserted (failure to assert the address the ADDRESS_HERE line indicates that the read targeted an illegal address.) Finally, the read must not be Not Acknowledged (NACK'ed) for any reason. A NACK'ed read is not allocated a read resource, and the requesting node must retry later.

If the read successfully appears on the bus without errors or nacks, it will be allocated a read resource by each CAM controller. When a read resource is allocated, its number is assigned through a priority encoder. Preferably, the priority encoder is implemented using hardware logic gates. A preferred embodiment of the priority encoder is shown in Table 1, in the form of pseudo code. Conversion form the pseudo code to hardware logic gates would be apparent to a parson skilled in the relevant art.

The priority encoder allocates the lowest numbered available resource. A section of the Read Resource Allocation Module is executed by each node to priority encode to find the lowest numbered bit read resource that is clear (i.e., not in use). (See the priority encode section beginning at code line 19.) Once a resource is allocated, it will remain valid until the de-allocation logic terminates the transaction. The remainder of Table 1 shows the pseudo code for handling errors during allocation.

Figure 4:
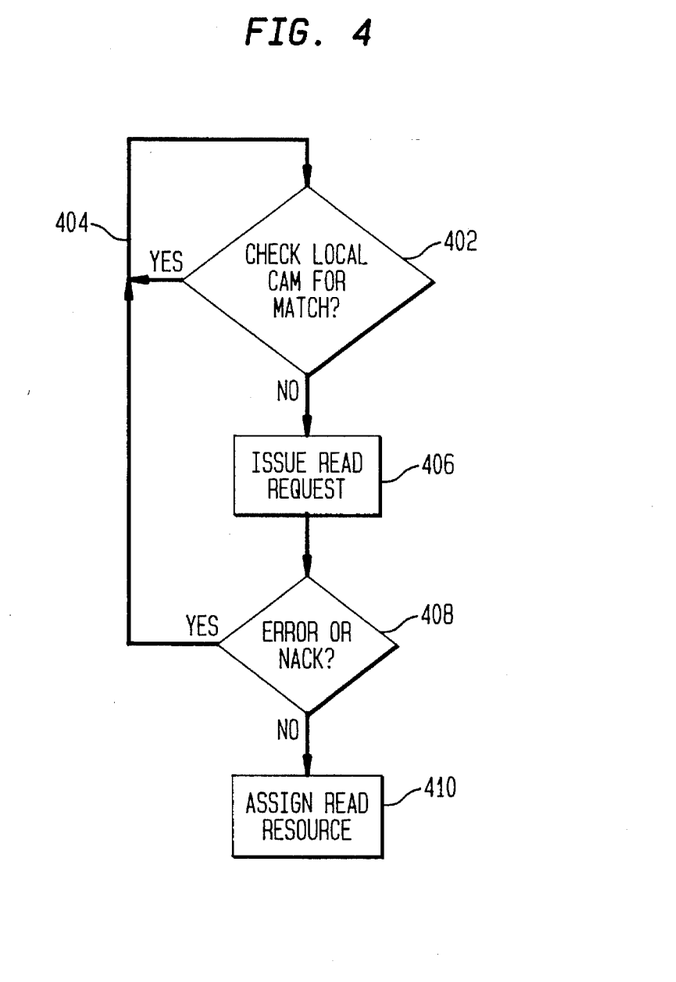
FIG. 4 is a flow chart generally describing the read resources allocation process of the present invention.

FIG. 4 is a flow chart generally describing the read resources allocation process. A check of the local CAM (the CAM of the node attempting a read request) is first conducted to determine whether a valid read resource for the transaction address is pending, as shown at step 402. If a match is determined as shown at the "yes" line, the node's CAM controller loops back to check again in the future, as shown at step 404. If no match is determined as shown at the "no" line, the node's CAM controller places a read request on the bus, as shown at step 406. If an error or nack is detected during a step 408 by the node that transmitted the read request, the node's CAM controller loops back to retransmit the read request again in the future, as shown at the "yes" line. Otherwise, all the CAMs assign a read resource, as shown at a step 410.

According to the above description, a node puts a request on the bus, if no errors or the like are detected, that request is allocated a read resource. All nodes track the read resource during its pendency; they cannot act on that transaction or do anything which interacts with that transaction for the duration of that period for which it is pending.

When, for example, memory responds to a read request, it will place the data on the bus and place the read resource number on the bus so that all nodes see that this read response is coming up in response to the read resource number which relates to the original transaction that created it. When that response successfully completes, the transaction is terminated and the read resource returns to the free pool.

If a processor puts a read on the bus and memory was going to respond but it turns out that another processor or node has the data in its cache, dirty or otherwise modified such that it is the most recent copy, then the node with the most recent copy is going to place the read response on the bus, assert the resource number, and the transaction will terminate. This is called a three-party transaction, because three nodes are involved. There is the original node requesting, a second node providing the data, and memory which plays a passive role by merely snooping the read response and updating its contents.

Read Resource De-allocation

A transaction is complete when it has been satisfied by a successful read response, or when it has remained pending too long, which causes a timeout error that frees the read resource. Table 2 below shows a pseudo code listing for de-allocation of read resources. It would be apparent to those skilled in the relevant art how to generate the necessary gates, or the like, to implement the logic described in Tables 1 and 2.

EXAMPLE 1

Basic Read Transaction

Figure 5:
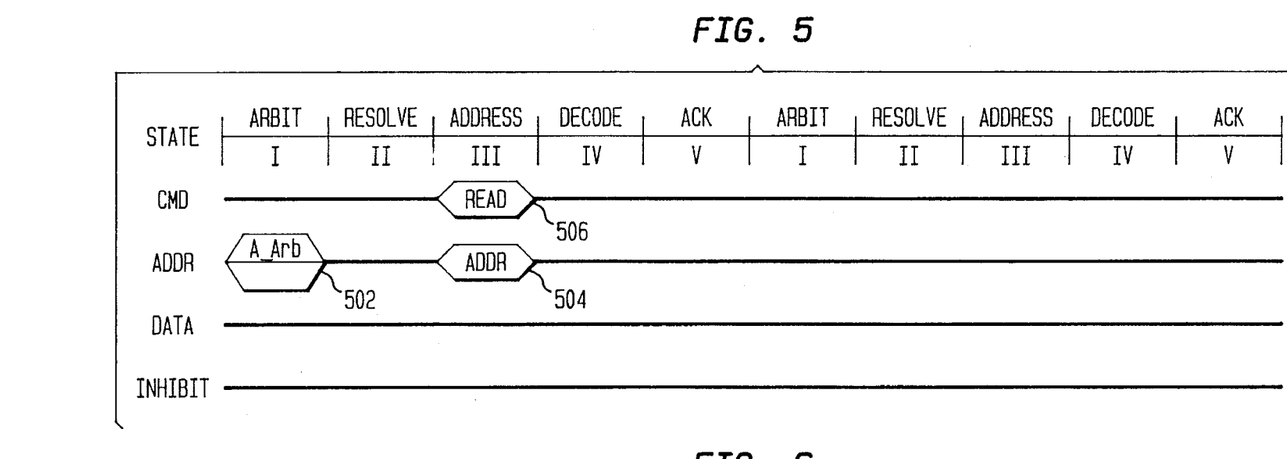
FIG. 5 shows a bus timing diagram in which a read request is successfully placed on the bus according to the present invention.

This example demonstrates a simple allocation and de-allocation of a read resource. FIG. 5 shows a bus timing diagram in which a read request is successfully placed on the bus. In this case, a node arbitrates for the address bus, as shown at 502. After being granted control of the address bus, the node issues the read request transaction by signalling a read on the command bus (CMD), as shown at 506, and broadcasting the read request address on the address bus, as shown at 504, during cycle III.

A read resource is allocated to the read request, and resource CAMs in each of the nodes store the address in the appropriate register. Note that no additional bus signals or commands are required to indicate which resource was allocated; each interface simultaneously and deterministically allocates the same read resource.

Figure 6:
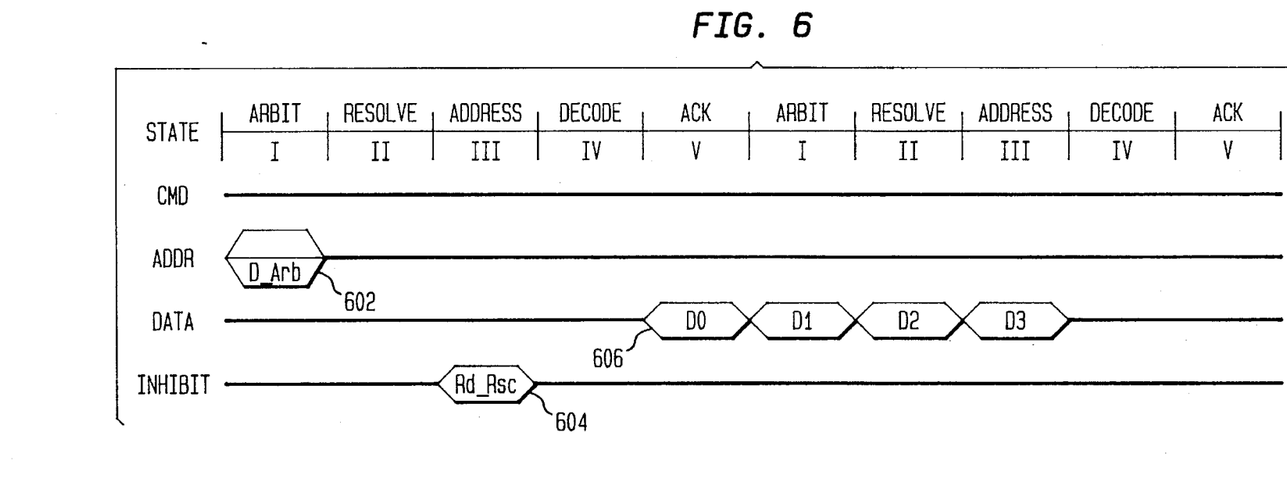
FIG. 6 shows a modification of the bus timing diagram of FIG. 5.

In the simplest case, the read resource will be de-allocated by a single successful read response. As illustrated in FIG. 6, after an unspecified amount of time (in this implementation, usually about 10 cycles after the read request) a responder, such as memory, arbitrates for the data bus, as shown at 602. During cycle III the responder also drives the read resource number to indicate which of the pending transactions is being responded to, as shown at 604. The responding node begins transmitting the read response data during cycle V, as shown at 606. In this example, the read response is successful and there were no inhibitors, so the read resource is de-allocated at the end of the response.

Data acknowledge is a flow control mechanism. A node receiving data that does not have sufficient available memory space to store that data can transmit a not acknowledge (NACK) signal which indicates to the node sending the data to stop and resend it. The time delay before the resend may be sufficient for the receiving node to allocate sufficient memory space to store the data. If not, another not acknowledge signal can be transmitted. In the absence of a NACK, a data acknowledge signal is implicit.

Non-split transactions are NACKed by any node which does not have sufficient buffering to accept the transactions. During a split transaction, the read request may be NACKed by the address bus NACK mechanism. The read response may be NACKed by the data bus NACK mechanism. A node which issues a read request should have sufficient buffering to accept the read response, but it is possible for memory to NACK a read response if it has no remaining write buffering (in the case of a three-party transfer).

If a transaction is NACKed, all nodes behave as if the transaction never occurred. The sending node will retry the transaction until it is not NACKed, or until a retry timeout occurs.

The example in FIG. 6 also demonstrates how the present invention conserves bus bandwidth. The read response (Rd_Rsc) to a specific read resource is driven on the Inhibit bus as shown at 604. The Inhibit bus is 8 bits (lines) wide and the Rd_Rsc that is driven actually drives high only one of the lines of the bus. The line that is driven is interpreted by all the CAMs to correspond to a specific one of the 8 read resources. Broadcasting just the Rd_Rsc rather that the entire address of the read resource conserves address bus bandwidth and is thus more efficient than conventional approaches that rebroadcast the address during the response. Conserving the address bus bandwidth in this manner frees the address bus so that a new transaction can use that address and command buses at the same time a Rd_Rsc is signalled.

EXAMPLE 2

Read Transaction with Inhibit

Figure 7:
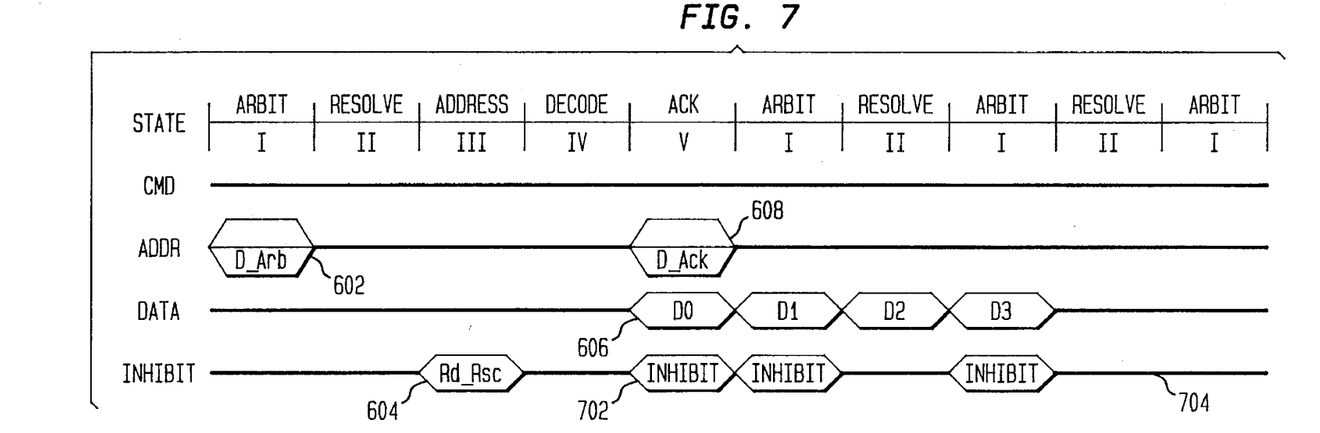
FIG. 7 shows a further modification of the bus timing diagram of FIG. 5.

In a second example illustrated in FIG. 7, the read resource is allocated as in example #1, with a successful read request. When the response occurs, however, one of the nodes has not yet completed checking for a more recent cached copy. To prevent the possibility of the original requestor from receiving bad data, the node still checking its cached copy will assert the inhibit signal for the corresponding read resource, as shown at 702. This informs the original requestor to accept the response currently being provided, but also to wait for the cache check to complete. In this case, the cache check was completed and no recent data for that address was found, so the inhibitor simply de-asserts the inhibit line for the pending read resource, as indicated by the absence of an inhibit signal during the last cycle I, as shown at 704. This completes the transaction and frees the read resource. Note that in this implementation, inhibit signals and tagging of read resources during read response use the same physical lines.

To avoid conflicts on these physical lines, the inhibit signals are only considered valid during bus cycles I and V. According to the bus protocol, the same node may drive the bus on subsequent cycles, but a dead cycle is always inserted between transmissions by two different nodes. The dead cycle permits the lines of the bus to settle before being driven by a different node. Because of this dead cycle, and the assignment of valid Inhibit signals during cycles I and V, during the middle cycle III read resource transactions are specified as valid on the address (Addr) and command (CMD) buses and read request transactions are specified as valid on the Inhibit bus. (See the dead cycles during cycles II and IV on the Inhibit bus in FIGS. 7 and 8, for example.) However, it is possible that a node driving a read resource number for a read response on the Inhibit bus is a different node than the node driving the Inhibit signal. Thus, there is a dead cycle between Inhibit drive cycle I and Rd_Rsc drive cycle III in FIG. 8.

EXAMPLE 3

Read Transaction with Inhibit and Second Response

Figure 8:
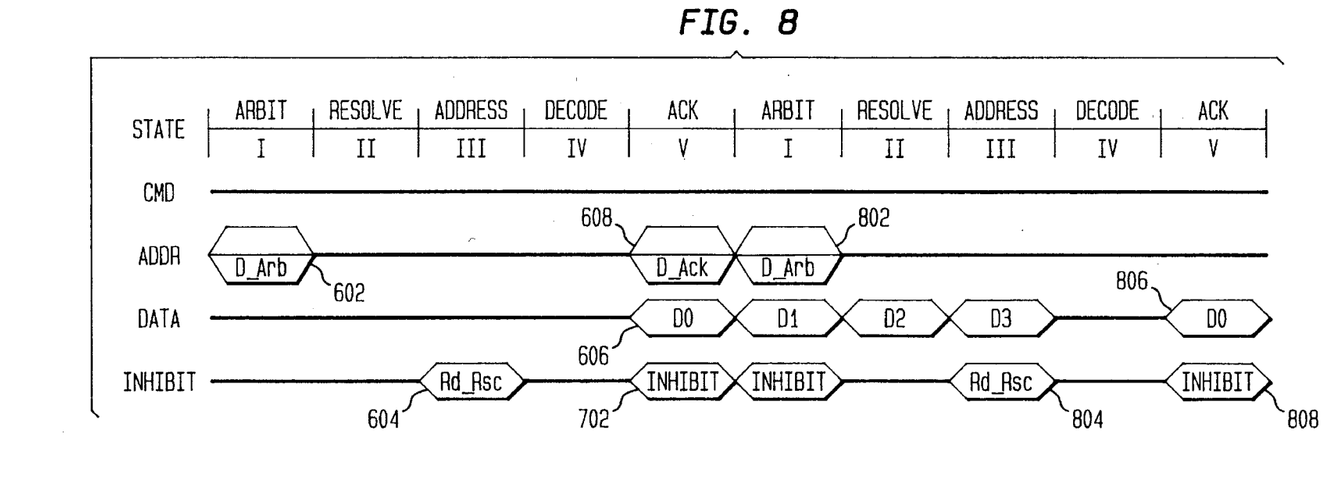
FIG. 8 shows a still further modification of the bus timing diagram of FIG. 5.

In a third example illustrated in FIG. 8, the read resource is allocated as in case #1, with a successful read request. Also, as in example #2, one of the nodes has not completed checking its cache for a more recent cached copy, so once again, the inhibit line for this pending read resource is asserted, as shown at 702. This time, however, the inhibitor discovers that it is holding a more recent cached copy, and will need to provide a second read response with the newer data. The inhibitor continues to drive the inhibit line for the appropriate read resource number while it arbitrates for the data bus, as shown at 802. Once the data bus is won and the second read response is successfully placed on the bus, as shown at 804, the inhibit line is dropped during cycle III, and the read resource is de-allocated. The original requestor discards the first read response in favor of the second response with newer data 806. Driving of an inhibit signal 808 is necessary to prevent a memory node with a buffer full condition from signalling a data NACK. Such signalling of a NACK would force the node driving the second read response to re-arbitration of the data bus and re-transmit the read response.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. All cited patent documents and publications in the above description are incorporated herein by reference.

TABLE 1

```
/* Read Resource Allocation Module - HDL Pseudo-code */
module rscalloc(ADDRESS_HERE, ADDR_ERR, A_NACK, A_VALID,
                BUS_CYC,CLK, CLR_RSC, READOP, RSC, RSC_NO);
/* Signal types and widths */
input ADDRESS_HERE, ADDR_ERR, A_NACK, A_VALID;
input [2:0] BUS_CYC;
input CLK;
input [7:0] CLR_RSC;
input READOP;
output [7:0] RSC;
output [2:0] RSC_NO;

/* module internal registers and wires */
reg [2:0] nextRSC_NO, RSC_NO;   /* becomes NEXT_RSC */
wire [7:0] next_RSCreg, RSCreg;  /* becomes RSC_VALID */
reg [2:0] next_set_no, set_no;
reg next_set_rsc, set_rsc, next_hold_aval, hold_aval;
reg [7:0] dec_set_no;
assign RSC = next_RSCreg;

/* priority encode to find lowest numbered bit of RSC which is clear */
always @(posedge CLK) RSC_NO = #1 nextRSC_NO;
always @(next_RSCreg)
        casex (next_RSCreg)
            8'b???????0: nextRSC_NO = 3'h0;
            8'b??????01: nextRSC_NO = 3'h1;
            8'b?????011: nextRSC_NO = 3'h2;
            8'b????0111: nextRSC_NO = 3'h3;
```

TABLE 1 (con't)

```
            8'b???01111: nextRSC_NO = 3'h4;
            8'b??011111: nextRSC_NO = 3'h5;
            8'b?0111111: nextRSC_NO = 3'h6;
            8'b01111111: nextRSC_NO = 3'h7;
            8'b11111111: nextRSC_NO = 3'h0;
        endcase /* decode the priority encoded value of set_no */
    always @(set_no) begin
            dec_set_no = 8'h0;
            dec_set_no[set_no] = 1'b1; end always @(posedge CLK) RSCreg = #1 next_RESreg;
    always @(posedge CLK) set_no = #1 next_set_no;
    always @(posedge CLK) set_rsc = #1 next_set_rsc;
    always @(posedge CLK) hold_aval = #1 next_hold_aval;

/* allocate resource during arbitration if a read occurred which */
    /* wasn't nack'ed. free any resources marked with a clear bit */
    /* (clear takes priority over set) on any cycle */ assign next_RSCreg = ((BUS_CYC == 'ARB) && set_rsc && !A_NACK
&&
                    ADDRESS_HERE && !ADDR_ERR) ?
                    ~CLR_RSC & (RSCreg | dec_set_no) :
                    ~CLR_RSC & RSCreg;
```

TABLE 1 (con't)

```
always @(set_no or set_rsc or hold_aval or BUS_CYC or
        RSC_NO or READOP or A_VALID)

begin
        /* save next resource number. and note to allocate it */
        if(BUS_CYC == 'ADDR_RES)
            begin
                next_set_no = RSC_NO;
                next_set_rsc = READOP & hold_aval; end
        else begin
            next_set_no = set_no;
            next_set_rsc = set_rsc; end
        /* remember whether A-Path is in use during ARB_RES cycle */
        if(BUS_CYC == 'ARB_RES)
            next_hold_aval = A_VALID;
        else
            next_hold_aval = hold_aval;
    end
endmodule
```

TABLE 2

/* Read resource de-allocation module - HDL pseudo code */
module rscfree( BUS_CYC, CLK, CLOCK_SYNC, DRSC, D_NACK,
                MAX_TIME,RSC, CLR_RSC, INHIBIT, TIME_OUT );

5      /* Signal types and widths */
       input [2:0] BUS_CYC;
       input CLK, CLOCK_SYNC;
       input [7:0] DRSC;
       input D_NACK;
10     input [19:0] MAX_TIME;
       input [7:0] RSC;
       output [7:0] CLR_RSC;
       output [7:0] INHIBIT;
       output [8:0] TIME_OUT;

15     /* module internal registers and wires */
       reg next_bsy_bus, bsy_bus;
       wire [7:0] INHIBIT, rsc_rcvd;
       reg [7:0] next_INHIBIT, next_rsc_rcvd;
       reg [5:0] mic_count, next_mic_count;
20     reg [7:0] next_seen_max, seen_max, nextTIME_OUT, TIME_OUT;
       reg    ClockSyncFound, nextCSF;
       reg [7:0] next_CLR_RSC;
       wire [7:0] CLR_RSC;
       reg one_micro_d;
25     wire one_micro, max_reached, clearTime;
       reg CLOCK_SYNC_d;
       reg max_reached_d;

TABLE 2 (con't)

```
always @(posedge CLK) begin ClockSyncFound = #1 nextCSF; end
always @(ClockSyncFound or CLOCK_SYNC)

begin
        if(CLOCK_SYNC)
          nextCSF = 1'b1;
        else
          nextCSF = ClockSyncFound;
        end always @(posedge CLK) begin CLOCK_SYNC_d = #1 CLOCK_SYNC; end assign clearTime = (~CLOCK_SYNC_d & ~ClockSyncFound);

time6 mtime(.CP(CLK), .clear(clearTime),
              .loadTime(6'd50), .load(CLOCK_SYNC_d),
              .count(1'b1), .zero(one_micro));

always @(posedge CLK) begin one_micro_d = #1 one_micro; end time20 utime(.CP(CLK), .clear(clearTime),
              .loadTime(MAX_TIME), .load(CLOCK_SYNC_d),
              .count(one_micro_d), .zero(max_reached));

/* use timer results to create TIME_OUT vector */
always @(posedge CLK) begin seen_max = #1 next_seen_max; end
always @(posedge CLK) begin max_reached_d = #1 max_reached; end
```

TABLE 2 (con't)

```
/* seen max is a vector giving those resources (or config read [8]) */
/* which have been allocated since the last timeout period (determined */
/* by MAX_TIME input). Everytime MAX_TIME is reached, next_seen_max is */
/* set to the current status of the resources (and config read), and */
/* TIME_OUT is set to the current seen_max anded with the current */
/* status of the resources. */
always @(posedge CLK) begin TIME_OUT = #1 nextTIME_OUT; end
always @(posedge CLK) begin bsy_bus = #1 next_bsy_bus; end
/* only clear TIME_OUT on ST_ARB, so that deallocation due to */
/* TIME_OUT works with deallocation due to read response, on */
/* the ARB cycle. */
always @(max_reached_d or seen_max or RSC or
        BUS_CYC or TIME_OUT)
    begin
    if(max_reached_d)
      begin
      next_seen_max = RSC;
      nextTIME_OUT = seen_max & RSC;
      end
    else
      begin
      next_seen_max = seen_max & RSC;
      if(BUS_CYC == 'ARB)
            nextTIME_OUT = 9'h0;
      else
            nextTIME_OUT = TIME_OUT;
      end
    end
```

TABLE 2 (con't)

/* output CLR_RSC is synchronous to CLK */

FD1P_8 reg_clr (.D(next_CLR_RSC), .Q(CLR_RSC), .CP(CLK));

/* only use TIME_OUT on ARB */

5 always @(BUS_CYC or D_NACK or rsc_rcvd or next_INHIBIT or INHIBIT
  or bsy_bus)
  begin
  if((BUS_CYC == 'ARB) && bsy_bus && ~D_NACK)
  next_CLR_RSC = (rsc_rcvd & ~next_INHIBIT) |
10    (~next_INHIBIT & INHIBIT) |
    TIME_OUT[7:0];
  else
  if(BUS_CYC == 'ARB)
   next_CLR_RSC  =  (~next_INHIBIT  &  INHIBIT)  |
15 TIME_OUT[7:0];
  else
   next_CLR_RSC = (~next_INHIBIT & INHIBIT);
  end FD1P_8 reg_inh (.D(next_INHIBIT), .Q(INHIBIT), .CP(CLK));
20 FD1P_8 reg_rsc (.D(next_rsc_rcvd), .Q(rsc_rcvd), .CP(CLK));

always @(BUS_CYC or DRSC or bsy_bus or INHIBIT or rsc_rcvd)

begin
  next_bsy_bus = bsy_bus;
  next_rsc_rcvd = rsc_rcvd;

```
                next_INHIBIT = INHIBIT;
```

TABLE 2 (con't)

```
            /* Sample INHIBIT if bus not idle, update inhibit from DRSC */ if(BUS_CYC == 'ARB)
                begin
                    if(bsy_bus) next_INHIBIT = DRSC;
                end /* sample INHIBIT on this cycle */ if(BUS_CYC == 'ARB_RES)
                begin
                    next_INHIBIT = DRSC;
                    next_bsy_bus = 1'b0;
                end /* flag that this was a transaction, not an idle bus */
            /* save DRSC on address cycle - will free rsc if no */
            /* inhibit or nack. */ if(BUS_CYC == 'ADDR_RES)
                begin
                    next_bsy_bus = 1'b1;
                    next_rsc_rcvd = DRSC;
                end
        end
    end
endmodule /* rscfree */
```

What is claimed is:

1. A read resource system for maintaining cache coherency in a multiprocessor environment pertaining split transactions, having a plurality of nodes coupled by a main system bus, comprising:

a plurality of read resources; and a plurality of read resource controllers coupled to the main system bus, each of said plurality of read resource controllers being uniquely associated with a respective one of the plurality of nodes, each read resource controller comprising:

means for storing said plurality of read resources in a plurality of storage elements wherein said read resources are numbered and stored in said storage elements according to numerical order, means for receiving a read request for data from one of the plurality of nodes uniquely associated with said read resource controller, means for comparing said read request with contents of said plurality of storage elements to determine whether a previous read request is concurrently seeking said data, means for broadcasting onto the main system bus said read request if said data is not concurrently sought by said previous read request, means for allocating one of said plurality of read resources to prevent the broadcast of a successive read request that seeks said data concurrently with a broadcasted read request, wherein said allocated read resource is a multi bit tag address corresponding to said data, and means for storing an allocated read resource in one of said plurality of read resources, wherein said plurality of read resource controllers determines the number of allocated read resources independently according to a predetermined protocol, such that said plurality of read resource controllers calculates an equivalent number.

2. The system according to claim 1, wherein each storage element is a register in a contents addressable memory (CAM) having a plurality of registers equal in number to said plurality of read resources.

3. The system according to claim 2, wherein said CAM includes eight registers, thereby providing eight read resources.

4. The system according to claim 2, wherein said one of said plurality of storage elements is adapted to store said address, and is adapted to store a valid/invalid flag which when set valid, indicates that said one of said read resources is currently being used to protect said broadcasted read request.

5. The system according to claim 4, wherein said means for comparing said read request with the contents of said storage elements comprises a plurality of comparators equal in number to said plurality of registers in said CAM.

6. The system according to claim 5, wherein said plurality of read resource controllers further includes means for deallocating said allocated read resource.

7. The system according to claim 6, wherein said means for deallocating deallocates said allocated read resource by marking flag of said allocated read resource invalid when said read resource controller receives a read response targeted to said read resource number corresponding to said read request.

8. The system according to claim 1, wherein non-coherent reads requests can not occupy all of said read resources.

9. The system according to claim 1, wherein coherent reads can occupy all of said read resources.

10. A method for maintaining cache coherency in a multiprocessor environment permitting split transactions, having a plurality of nodes coupled by a main system bus, comprising the steps of:

providing a plurality of read resource controllers, each of said plurality of read resource controllers being uniquely associated with a respective one of the plurality of nodes;

providing a plurality of storage elements in said plurality of read resource controllers; receiving a read request for data in one of the plurality of nodes;

comparing said read request with the contents of said plurality of storage elements to determine whether a previous read request is currently seeking said data;

broadcasting onto the main system bus said read request if said data is not concurrently being sought by said previous read request;

allocating one of said plurality of read resources to protect said read request if said read request was broadcast onto the main system bus; and storing an allocated read resource comprising a multi-tag address corresponding to said data according to a read resource number in one of said plurality of storage elements in each read resource controller, wherein said read resource number is determined independently according to a predetermined protocol, such that each node arrives at an equivalent number.

11. The method according to claim 10, wherein a total of eight read resources are supported.

12. The method according to claim 10, further including the step of deallocating said allocated read resource.

13. The method according to claim 12, wherein said step of deallocating deallocates said allocated read resource by marking said allocated read resource invalid when said read resource controller receives a read response targeted to said read resource number corresponding to said read request.

* * * * *